United States Patent
Schwarz et al.

(10) Patent No.: US 10,933,896 B2
(45) Date of Patent: Mar. 2, 2021

(54) METHOD AND APPARATUS FOR DETERMINING CHANGES IN THE LONGITUDINAL DYNAMIC BEHAVIOR OF A RAILWAY VEHICLE

(71) Applicant: Knorr-Bremse Systeme für Schienenfahrzeuge GmbH, Munich (DE)

(72) Inventors: Christoph Schwarz, Eching (DE); Benjamin Heckmann, Poing (DE)

(73) Assignee: KNORR-BREMSE SYSTEME FÜR SCHIENENFAHRZEUGE GMBH, Munich (DE)

( * ) Notice: Subject to any disclaimer, the term of this patent is extended or adjusted under 35 U.S.C. 154(b) by 0 days.

(21) Appl. No.: 16/637,364

(22) PCT Filed: Jul. 27, 2018

(86) PCT No.: PCT/EP2018/070435
§ 371 (c)(1),
(2) Date: Feb. 7, 2020

(87) PCT Pub. No.: WO2019/030022
PCT Pub. Date: Feb. 14, 2019

(65) Prior Publication Data
US 2020/0385036 A1    Dec. 10, 2020

(30) Foreign Application Priority Data
Aug. 10, 2017    (DE) .................... 10 2017 213 970.6

(51) Int. Cl.
| | | |
|---|---|---|
| *B61L 15/00* | (2006.01) | |
| *B60T 17/22* | (2006.01) | |
| *B61L 27/00* | (2006.01) | |
| *B61F 5/24* | (2006.01) | |
| *B61F 5/44* | (2006.01) | |

(52) U.S. Cl.
CPC ........ *B61L 15/0081* (2013.01); *B60T 17/228* (2013.01); *B61F 5/24* (2013.01); *B61F 5/44* (2013.01); *B61L 27/0094* (2013.01)

(58) Field of Classification Search
CPC ............. B61L 15/0081; B61L 27/0094; B60T 17/228; B61F 5/24; B61F 5/44
See application file for complete search history.

(56) References Cited

U.S. PATENT DOCUMENTS 5,039,071 A * 8/1991 Irle .................. B61F 5/302
                                                267/52
8,234,917 B2 * 8/2012 Burkhart ............. B61K 9/00
                                                73/117.03
(Continued)

FOREIGN PATENT DOCUMENTS

DE    19908850 A1    9/2000
DE    10062602 A1    6/2002
(Continued)

OTHER PUBLICATIONS

International Search Report issued in corresponding PCT Appln. No. PCT/EP2018/070435 dated Dec. 13, 2018.

*Primary Examiner* — Russell Frejd
(74) *Attorney, Agent, or Firm* — Carter, DeLuca & Farrell LLP

(57) ABSTRACT

A method for determining changes in the longitudinal-dynamic behavior is disclosed, in particular of an undercarriage, of a railway vehicle for identifying a current driving condition of the railway vehicle, wherein variables, which cannot be measured and which characterize the longitudinal-dynamic behavior, are reconstructed and evaluated via a system model of the railway vehicle by means of a cybernetic observer from a known or metrologically determined input signal and at least one measuring signal of the observed railway vehicle as an observed real reference (Continued)

system. The at least one measuring signal of the observed railway vehicle and a corresponding reconstructed measuring signal of the system model are compared and the deviation determined by comparison is recursively tracked with a regulator so that the determined deviation is minimized.

12 Claims, 1 Drawing Sheet

(56) References Cited

U.S. PATENT DOCUMENTS 8,276,440 B2 * 10/2012 Wach ................ B61K 9/00
73/117.01

| | | | |
|---|---|---|---|
| 2015/0283934 A1* | 10/2015 | Kern | B60P 3/40 280/426 |
| 2016/0304103 A1* | 10/2016 | Meyer | B61F 5/386 |
| 2017/0038274 A1* | 2/2017 | Reiter | G01M 17/04 |

FOREIGN PATENT DOCUMENTS

| DE | 102008028264 B3 | 12/2009 |
|---|---|---|
| DE | 102008038753 A1 | 2/2010 |
| DE | 102011113084 A1 | 3/2013 |
| DE | 102011113093 A1 | 3/2013 |
| DE | 102012004892 A1 | 9/2013 |
| DE | 102012217721 A1 | 4/2014 |
| WO | 2004022406 A1 | 3/2004 |
| WO | 2006113954 A1 | 11/2006 |

* cited by examiner

METHOD AND APPARATUS FOR DETERMINING CHANGES IN THE LONGITUDINAL DYNAMIC BEHAVIOR OF A RAILWAY VEHICLE

CROSS REFERENCE TO RELATED APPLICATIONS

This application is a national phase of PCT Application No. PCT/EP2018/070435 filed on Jul. 27, 2018, which claims the benefit of and priority to German Patent Application No. 10 2017 213 970.6, filed on Aug. 10, 2017, each of which are hereby incorporated by reference herein in their entirety.

TECHNICAL FIELD

The invention describes a method and an apparatus for determining changes in the longitudinal-dynamic behavior, in particular of an undercarriage, of a railway vehicle for identifying a current driving condition of the railway vehicle. Furthermore, the invention relates to a computer program product.

BACKGROUND

Changes in the longitudinal-dynamic behavior of undercarriages in railway vehicles are attributed to varying wear conditions, relative movements between individual undercarriage components and changing environmental conditions, such as the ambient temperature, the temperature of individual undercarriage components, humidity, and pollution. The effects mentioned above predominantly result in two longitudinal-dynamically relevant aspects. On the one hand, there are fluctuations in the friction coefficient between a brake disc and a brake pad associated to the brake disc or between a wheel and a brake block associated to the wheel. On the other hand, there are fluctuations in the adhesion between a wheel or wheelset and the rail on which the railway vehicle moves. The fluctuations in the longitudinal dynamics can occur during both an acceleration phase and a braking phase of the railway vehicle.

With modern railway vehicles, it is known to provide a plurality of sensors and to detect forces or torques exerted during braking or acceleration. The knowledge of the accelerating or braking forces or accelerating or braking torques can be used for the control or regulation of a braking or accelerating action, in particular to avoid slipping (spinning) or locking conditions of wheels and to effectively use the greatest possible adhesion between wheel and rail for braking or accelerating. However, the provision of a plurality of sensors on a railway vehicle is expensive and requires considerable maintenance work, as these are exposed to a variety of environmental influences.

The determination of the potential braking capacity of railway vehicles is usually carried out on the basis of parameters which represent the worst vehicle condition to be expected, in order to be able to guarantee sufficient safety reserves at any time. This has the disadvantage that the calculated braking capacity may, under certain circumstances, result in braking restrictions which impede the economic operation of the railway vehicle. For example, if a braking capacity is assumed to be too low, unnecessary speed limits may result on certain track sections.

From DE 10 2011 113 093 A1, a controller for a brake system of a railway vehicle is known, the brake system of which comprises a friction brake device depending on adhesion. The controller is configured to determine a braking effect exerted during a braking action based on a braking pressure and at least one further parameter. Thus, brake force sensors or brake torque sensors for determining the braking effect may be omitted. In particular a deceleration, a vehicle speed or at least one wheel speed is detected as a further parameter, in order to determine, on the basis of this parameter, the vehicle speed or, if the wheel speed changes, an acceleration or deceleration of the respective wheel.

From WO 2015/128147 A1, a method is known that enables a practical determination of the braking capacity. This is done by determining a measured condition value and using this measured condition value and at least one further measuring value when calculating the braking capacity. This can be, for example, the wheel diameter or the vehicle weight or an air pressure in the air suspension. The further measuring value indicates the condition of the vehicle or of a vehicle component of the vehicle.

Existing adhesion control methods are based on certain assumptions regarding the operating conditions with respect to rail pollution, climatic conditions and the like, and optimize the adhesion between the wheel and the rail under these assumptions. High slip values can thus be avoided. However, sanding is usually used to improve adhesion between the wheel and the rail. This in turn leads to increased wear of the wheels and the rails.

From the WO 2015/136137 A1, a method is known in which adhesion is optimized in one mode and slippage loss is reduced in another mode. In the latter case, the abrasion on the contact surface between the wheel and the rail is reduced.

These methods known from the state of the art are therefore dependent on the knowledge of certain parameters. As a result, these methods possibly cannot be used depending on the undercarriage and the undercarriage structure. Additionally, due to partially rapidly changing friction conditions, a manual, experience-based regulation of the braking or driving force is necessary to observe braking distances and to keep wear of the wheelsets and rails and of the driving and braking components low.

SUMMARY

It is an object of the invention to provide a method and an apparatus which allow to determine changes in the longitudinal-dynamic behavior of a railway vehicle, in particular of an undercarriage, more easily and independently of the undercarriage structure.

This object is achieved by a method according to the features of claim 1, a computer program product according to the features of claim 11 and an apparatus according to the features of claim 12. Advantageous embodiments can be derived from the dependent claims.

A method for determining changes in the longitudinal-dynamic behavior, in particular of an undercarriage, of a railway vehicle for identifying a current driving condition of the railway vehicle is proposed. The method is characterized in that variables, which cannot be measured and which characterize the longitudinal-dynamic behavior, are reconstructed and evaluated via a system model of the railway vehicle by means of a cybernetic observer from a known or metrologically determined input signal and at least one further measuring signal of the observed railway vehicle as an observed real reference system, wherein the at least one measuring signal of the observed railway vehicle and a corresponding reconstructed measuring signal of the system model are compared and the deviation determined by comparison is recursively tracked with a regulator so that the determined deviation is minimized.

By using a cybernetic observer, the proposed method requires only a few measuring signals. In particular, measuring signals can be used that are already used in a conventional brake or drive control. The method allows a characterization of the undercarriage dynamics in all driving and braking scenarios, such as full braking, service braking and, with sufficient resolution of at least one measuring signal, also slide protection intervention in the case of a friction value-dependent braking.

The possibility of using different sensor-based measuring signals allows, depending on the type of the undercarriage, to realize an easily accessible and thus maintenance-friendly and cost-effective design for determining changes in the longitudinal-dynamic behavior. Due to the small number of sensors required to provide the at least one measuring signal and the possibility to position them in a flexible manner, the effort for sensors and for laying connecting cables can be minimized.

The method can be used for the measurement of fluctuations in the longitudinal dynamics of railway vehicles, in particular for the undercarriages (e.g. bogies) of passenger trains. An application in undercarriages of freight wagons is also possible, provided that power supply is ensured for the sensor units required to provide the at least one measuring signal.

A railway vehicle is generally understood to be a track-bound vehicle, such as a locomotive, a railcar train-set, a railcar, a tram, an underground vehicle, a wagon, such as a passenger train and/or freight wagon.

A brake used to decelerate a railway vehicle may act on a brake disc of a wheel or a wheelset or on the tread of a wheel (block brake). The brake may be operatively connected to a wheel, a wheelset or a plurality of wheels. The brake may be constructed of a plurality of components or elements, in particular, the brake may comprise a brake disc, at least one brake pad acting on the brake disc, a caliper operatively connected to the brake pad and an actuator. The brake caliper can be pivotably connected to a console by means of two bearing points, wherein the two bearing points are spaced from one another at a bearing distance. The brake disc has an axis of rotation which is at a distance from the (closer) first of the two bearing points, wherein this distance may be referred to as an installation dimension. The installation dimension can be understood as a horizontal distance with respect to the installation. The console can be firmly connected to a chassis of the railway vehicle.

The brake can be actuated in response to a brake signal. The brake signal can be a brake request signal or a signal of a brake request. When the brake is actuated, a friction element of the brake, for example the brake pad or the brake block, may counteract a force acting during the rotation of the wheel in the circumferential direction or in the direction of movement of the wheel or wheelset of the railway vehicle. In this way a braking torque can be applied from the brake pad to the brake disc and thus to the wheel or from the brake block to the wheel.

The brake may be part of a pneumatic, in particular an electro-pneumatic brake system or a hydraulic, in particular an electro-hydraulic brake system. Such a brake may comprise several brakes as described above. The brake can also be an electrically actuated brake in which an electric braking current is converted into a braking force to actuate friction elements.

Expediently, the input signal is fed not only to the observed real reference system but also to the system model, so that the system model that emulates the observed real reference system can reconstruct the measuring signal of the system model.

In an expedient embodiment, the input signal and/or the at least one measuring signal are detected on one or more of the following components of the railway vehicle: on a railcar body; on an undercarriage of the railway vehicle; (on at least one bogie of the railway vehicle;) on at least one wheelset of the railway vehicle. The detection of at least one measuring signal with a respective measurement sensor can thus take place at various locations on the railway vehicle, e.g. such locations which, depending on the design of the railway vehicle or undercarriage, are particularly easily accessible and/or protected from environmental influences. This makes the apparatus particularly easy to maintain and cost-effective to implement.

Expediently, it is provided that the at least one measuring signal is detected simultaneously on opposite sides of the undercarriage or the railcar body or the wheelset. The combination of two sensor units at laterally opposite locations of the undercarriage or the railcar body or the wheelset makes it possible to clearly separate the effects of cornering from the longitudinal-dynamic effects of a braking or accelerating action of the railway vehicle.

A braking pressure of a brake actuator or a braking current for generating a braking force that decelerates the railway vehicle can be processed as the input signal. The braking force can then be generated as a function of a normal force, which is generated by pressing a brake pad or brake block moved by the brake actuator onto a brake disc or wheel, and a friction coefficient. This makes it possible to determine changes in the longitudinal-dynamic behavior during a braking action.

If a driving force or motor current for generating a force that accelerates the railway vehicle is processed as the input signal, a drive scenario in which the railway vehicle is accelerated can be evaluated.

A large number of different measurement variables can be detected as the at least one measuring signal by means of one or more measurement sensors. A combination of similar or different measuring signals is also possible.

For example, a rotational speed or a change of rotational speed of at least one wheelset can be detected as the at least one measuring signal. The metrological detection of a rotational speed or of a change of rotational speed allows a high-precision determination of the variables characterizing the longitudinal-dynamic behavior, since the rotational speed or the change of rotational speed is directly mechanically related to the variables characterizing the longitudinal-dynamic behavior.

Alternatively or additionally, a strain of a component transmitting a longitudinal force, in particular a pull/push-rod or a pivot pin or a lemniscate lever or a wheelset guide, can be processed as the at least one measuring signal. Strains can, for example, be detected by a measuring strip and other well-known sensor units.

Alternatively or additionally, a spring deflection in one or more spring stages can be processed as at least one measuring signal. Spring deflection can be measured by means of optical sensor units, a cable pull measurement or inductively working plungers.

According to an expedient embodiment, the evaluation of the variables characterizing the longitudinal-dynamic behavior comprises a comparison of the variables of successive undercarriages or railcar bodies or wheelsets. Thus, information from undercarriages or railcar bodies or wheelsets running ahead in the direction of travel of the railway vehicle, such as changed conditions regarding the contact between the wheel and the rail, can be processed as a prediction for subsequent undercarriages or railcar bodies or wheelsets. By comparing the results of successive undercarriages or railcar bodies or wheelsets, it can be determined whether changes in the longitudinal-dynamic behavior are track-related or have causes on the vehicle side. Changes in the longitudinal-dynamic behavior that occur with a time delay on several undercarriages or railcar bodies or wheelsets indicate track-side influences. These include, for example, weather-related changes in the friction coefficient at the contact between the wheel and the rail. Changes in the longitudinal-dynamic behavior which, on the other hand, only occur at individual undercarriages or railcar bodies or wheelsets indicate influences from the vehicle side at the respective undercarriage or railcar body or wheelset.

Thus, the method allows a continuous monitoring of wear on wheels or brake units, since changes in the longitudinal-dynamic behavior are (can be) continuously detected and recorded.

The method is particularly suitable for such railway vehicles in which quasi-static environmental conditions are present or the qualitative, temporal course of the changes is known. Although it is preferably applicable in particular to undercarriages and wheelsets of passenger trains, it can also be used in undercarriages of freight wagons, provided that power supply of the device for determining changes in the longitudinal-dynamic behavior, in particular of the control unit and the at least one sensor unit, is ensured.

The method further provides a computer program product that can be loaded directly into the internal memory of a digital controller and includes software code segments that, when the product is running on the controller, carry out the steps of the method described herein. The computer program product may have the form of a CD-ROM, DVD, USB stick or other storage medium. The computer program product may also have the form of a signal that can be loaded over a (wireless or wired) network.

The invention further provides an apparatus for determining changes in the longitudinal-dynamic behavior, in particular of an undercarriage, of a railway vehicle for identifying a current driving condition of the railway vehicle. The device comprises a control unit and at least one sensor unit for providing a respective measuring signal. The control unit is configured to reconstruct and evaluate variables, which cannot be measured and which characterize the longitudinal-dynamic behavior, via a system model of the railway vehicle by means a cybernetic observer from a known or metrologically determined input signal and the at least one measuring signal of the observed railway vehicle as an observed real reference system. The control unit is further configured to compare the at least one measuring signal of the observed railway vehicle and a corresponding reconstructed measuring signal of the system model and to recursively track, with a regulator, the deviation determined by comparison so that the determined deviation is minimized.

The apparatus according to the invention has the same advantages as those described above in connection with the method according to the invention.

In summary, the present invention provides for the combination of different sensor signals in a cybernetic observer. By means of the cybernetic observer it is possible to clearly identify the current driving condition of the railway vehicle by the synthesis of a known or metrologically determined input signal and at least one measuring signal as well as a model-based estimation of the dynamics of the railway vehicle. The dynamics of the undercarriage of the railway vehicle determined on the basis of the model-based approach is recursively adjusted by means of a comparison with the metrologically detected measuring signals, so that the calculated dynamics correlate with the actual dynamics of the railway vehicle. The method allows a characterization of undercarriage dynamics in all driving and braking scenarios, such as full braking, service braking and slide protection intervention with friction-dependent braking.

BRIEF DESCRIPTION OF THE DRAWINGS

The invention is explained in more detail below with respect to an embodiment. In the drawings are.

DETAILED DESCRIPTION

Figure 1:
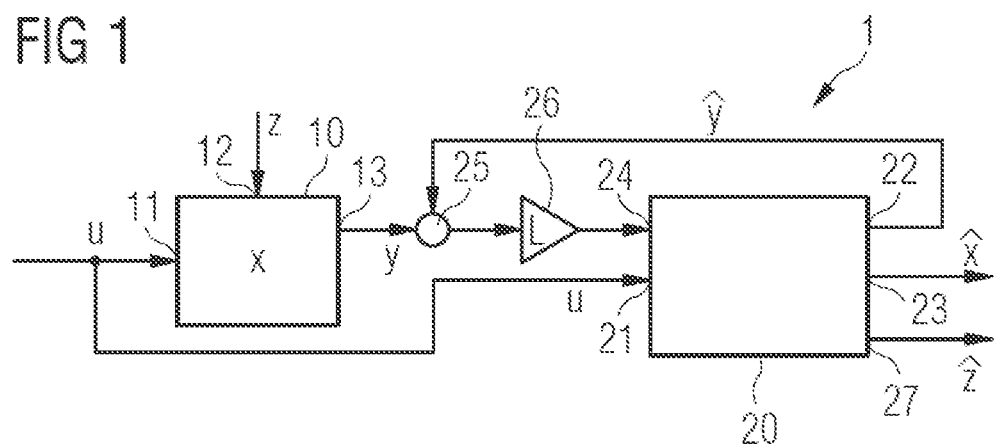
FIG. 1 a schematic depiction of a block diagram of a cybernetic observer, as it is used in the method according to the invention.

The below described method for determining changes in the longitudinal-dynamic behavior is used for a railway vehicle which is not shown in detail in the figures. Such a railway vehicle has one or more units which are movably connected to each other. A coupling device is provided for connecting the vehicle units. Depending on the design of the railway vehicle, each vehicle unit may have two undercarriages, each provided with at least one wheelset. Alternatively, a railway vehicle with two vehicle units may also have three undercarriages, each provided with at least one wheelset. An undercarriage usually comprises two wheelsets. The wheelsets of the undercarriages are each provided with wheels which are running on a rail.

A plurality of sensor units (in short: sensors) can be provided on the railway vehicle. The railway vehicle may, for example, have one or more sensors for determining the vehicle speed and/or an acceleration or deceleration of the railway vehicle in the longitudinal direction of the vehicle. The acceleration may be a positive acceleration due to a force accelerating the railway vehicle, or a negative acceleration due to a braking force decelerating the railway vehicle. The (positive or negative) acceleration can be a total acceleration of the railway vehicle. If an acceleration sensor is attached to a respective vehicle unit, the acceleration can also be the respective (positive or negative) acceleration of the respective vehicle unit. Acceleration may, for example, be a deceleration occurring at an undercarriage or at the railcar body of a railway vehicle. The acceleration can be determined based on speed data. The deceleration can be inferred from a temporal course and/or a change in the vehicle speed. The deceleration can be determined by considering the course of the speed in time periods that are shorter than the duration of a (positive or negative) acceleration. It may thus be provided that at least one acceleration sensor is associated to each vehicle unit and/or undercarriage. Such sensors are often designated for monitoring the driving conditions, so that already existing sensors can be used to determine the (positive or negative) acceleration.

For determining the vehicle speed, for example, a radar system, an optical sensor device and/or a communication device for receiving satellite data, to which a control device of the railway vehicle is or can be connected, can be provided.

In addition, sensors may be provided to determine the rotational speeds and changes of rotational speed of at least one wheelset. The determination of the wheel speed can, for example, be used to determine a braking effect and is already installed in many railway vehicles. It is also conceivable that the vehicle speed is determined based on wheel speed data. From wheel speed data associated to individual wheels or wheelsets, it is possible to determine a speed associated to the respective wheel or wheel axis, for example a circumferential speed or wheel speed. In addition to wheel speed data, the radius of the wheel can also be taken into account.

From a change of wheel speed of at least one wheel-set, for example, a (positive or negative) acceleration at an associated wheel-set or an associated wheel axis can be derived.

Such a railway vehicle may be equipped with sensor units to detect pitching movements of individual components about the transverse axis of the vehicle. Such sensor units are preferably associated to a respective vehicle transverse axis. For example, acceleration sensors can be used to detect an acceleration about the vehicle's transverse axis.

In addition, the railway vehicle may be equipped with at least one sensor unit which detects a spring deflection in respective spring stages of a vehicle unit of the railway vehicle. Such sensors can be realized optically, by means of cable pull measurement or by inductive plungers.

By means of longitudinal force sensors, e.g. strain gauges, strains of longitudinal force transmitting components can be determined. Such a sensor unit can be associated to a respective push/pull rod, a respective pivot pin or a lemniscate lever or a respective wheelset guide.

Furthermore, brake pressure sensors or brake current sensors and/or brake efficiency sensors such as brake force or brake torque sensors associated to the undercarriages or to the friction brake devices of an adhesion-dependent friction braking apparatus arranged on the undercarriages may be provided. In general, a brake pressure sensor or brake current sensor can be considered to be associated with a friction brake device if it is able to detect a brake pressure or brake current individually actuating the friction brake device. A braking force sensor or a braking torque sensor may be considered to be associated with a friction brake device or a set of wheels to be braked by the friction brake device if it is able to detect a braking force applied by the friction brake device or a corresponding braking torque.

By means of the cybernetic observer described below, it is possible to emulate the frequently different undercarriage superstructures in a train set of a railway vehicle with a uniform model-based algorithm. An unambiguous estimation of the undercarriage dynamics of the railway vehicle can be ensured by a combination of a plurality of measuring signals.

FIG. 1 shows a block diagram of the basic structure of a cybernetic observer 1, which helps to carry out the method for determining changes in the longitudinal-dynamic behavior of the railway vehicle. In a way known to a skilled person, cybernetic observer 1 comprises a system model 20 of the railway vehicle and a unit 26 for weighting the comparison result of system model 20 and an observed real reference system 10. The dynamics of observed real reference system 10, i.e. the observed railway vehicle, is influenced by an input signal u which is fed to observed real reference system 10 at a first input 11. The input signal u is a measurable signal. In the case of braking of the railway vehicle with friction brakes, the input signal u may correspond to a brake pressure of the brake system/device. If braking is carried out by means of an electric brake, the input signal may be a braking current for generating a braking force which decelerates the railway vehicle. If, on the other hand, a change in the longitudinal-dynamic behavior due to acceleration is to be detected, the input signal u can be a driving force or a motor current for generating the force which accelerates the railway vehicle.

The dynamics of observed real reference system 10 is described by states x. Here, x can be a vector with a plurality of different states. Since observed real reference system 10 is provided with at least one sensor unit as described above, at least one measuring signal y is provided at an output 13. Here, y can be a vector whose number of vector entries corresponds to the number of (real) measuring signals. The acquired measuring signals can originate from sensor units of the same and/or a different type.

The observed real reference system 10, i.e. the railway vehicle, can also be excited by non-measurable disturbances z. These non-measurable disturbances z are fed to reference system 10 at a second input 12. The disturbance variable z is defined as all those influences which influence the friction coefficient between the wheel and the rail and/or between the brake pad and the brake disc and/or the brake block and the wheel.

This also includes those influences which influence the friction radius, i.e. the point of application of a brake pad to the brake disc. Furthermore, a total weight changing due to a changing loading condition of reference system 10, i.e. the railway vehicle, may occur as a disturbance z.

The system model 20 represents a model of the dynamic behavior of reference system 10, i.e. the railway vehicle. The system model 20 can, for example, be formed by software. The system model 20, like reference system 10, is controlled by the input signal u. The input signal u is supplied to system model 20 at a first input 21. The system model 20 determines values for at least one reconstructed measuring signal $\hat{y}$, which is provided, e.g. also as a vector, at a first output 22. A respectively reconstructed vector entry of the measuring signal $\hat{y}$ is assigned to a metrologically determined vector entry of the measuring signal y of reference system 10.

Since the system model 20 generally cannot emulate the entire dynamics of reference system 10 and reference system 10 is also influenced by the non-measurable disturbance variables z, the dynamic behavior of system model 20 deviates a priori from the real behavior of reference system 10. For this reason, a comparison of the at least one reconstructed measuring signal $\hat{y}$ (i.e. its vector entries) with the metrologically determined at least one measuring signal y (i.e. the assigned vector entries), which is provided at output 13 of reference system 10, is conducted. These two measuring signals are supplied to a comparator 25, which generates a difference. The deviation $(y-\hat{y})$ is supplied to a unit 26 for weighting the comparison result. The L-weighted feedback of the deviation $(y-\hat{y})$ is provided to system model 20 at a second input 24. The weighting by unit 26 is conducted such that, after a certain time period, the behavior of the reconstructed measuring signal $\hat{y}$ calculated by system model 20 corresponds to the actually measured at least one measuring signal y, i.e. the deviation becomes zero after a certain time period. This process is performed automatically and recursively.

At a second output 23 of system model 20, the desired dynamic values $\hat{x}$ can then be read, which represent the longitudinal-dynamic behavior of the railway vehicle. These are, for example, non-measurable variables, such as speeds and friction coefficients between the wheel and the rail and between the brake pad and the brake disc, braking forces and braking torques and the like. Furthermore, disturbance variables 2 can be read at a third output 27 of system model 20.

Figure 2:
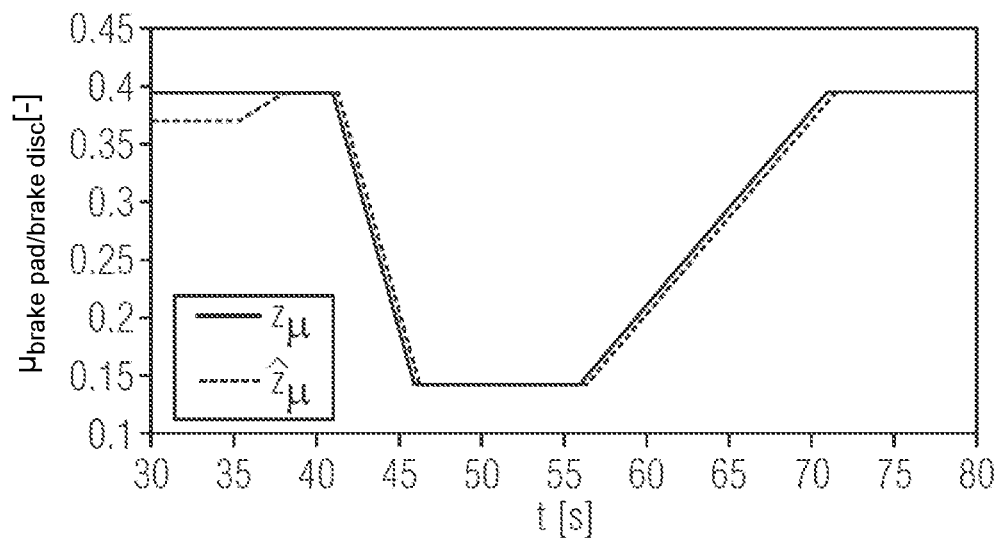
FIG. 2 a graphic depiction showing a comparison of an actual friction coefficient and a friction coefficient determined by the method according to the invention as a function of time.
Figure 3:
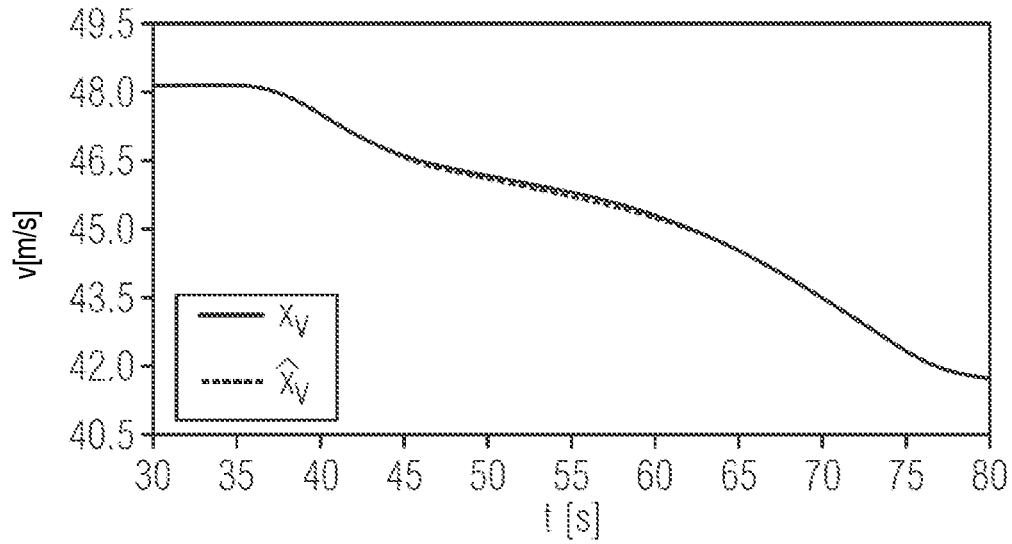
FIG. 3 a graph showing a time-dependent, translational longitudinal speed of the railway vehicle as a function of the friction coefficient curve shown in FIG. 2.

FIGS. 2 and 3 show the results of the procedure for a braking process on the basis of simulation results. FIG. 2 shows the friction coefficient curve μ(t) between the brake pad and the brake disc as a function of time t. FIG. 3 shows the change in the longitudinal speed v(t) as a function of the same time period. A period from t=30 s to t=80 s is shown. It is assumed that within the period from t=35 s to t=80 s a railway vehicle wheelset is braked with a constant braking pressure. The respective curves $z_\mu$, $x_v$ shown with a solid line in FIGS. 2 and 3 show the time curve of the track model, while the broken lines show the calculated values $\hat{z}_\mu$, $\hat{x}_v$ of system model 20. In this example it is assumed that, in addition to the wheelset speed ω, the translational longitudinal speed v of a wheelset is measured, i.e. they are provided as measuring signals y at output 13 of reference system 10.

FIG. 2 shows the temporal course of the friction coefficient μ between the brake pad and the brake disc, as it results from fluctuating influences during braking with constant brake pressure. The depicted variation of the actual friction coefficient (solid line) is represented by means of the feedback of the above described variation (y−ŷ) and the design of unit 26 selected (by numerical simulation, testing or calculation) to weight the comparison result from the system model. The longitudinal speed v as one of the states x of reference system 10 and as one of the variables characterizing the longitudinal-dynamic behavior x̂ of system model 20 is illustrated in FIG. 3. The feedback of the deviation (y−ŷ) of the measured signal y provided at output 13 and of the reconstructed measured signal ŷ at first output 22 of the system model causes the motion calculated by the system model 20 to correlate with the actual system behavior.

The effect of the reduced friction coefficient μ between t=40 s and t=70 s results in the longitudinal speed v decreasing less rapidly in the specified time range, which leads to a longer braking distance and can therefore represent a safety risk.

In the example shown, the application of this method allows to determine the necessary braking pressure on the basis of the calculated friction coefficient μ between the brake pad and the brake disc, which is necessary to maintain a prescribed braking distance. This determination is made in a control unit whose design and procedure are not the subject of the present invention.

Furthermore, the knowledge of the friction coefficient μ allows conclusions about the wear condition of the brake pad, which enables condition-oriented maintenance.

The information thus obtained from leading wheelsets or undercarriages or railcar bodies may be provided in an appropriate manner as a prediction for subsequent wheelsets or undercarriages or railcar bodies. This evaluation is also carried out in a control unit and is not the subject of this considerations. By comparing the results of successive wheelsets or undercarriages or railcar bodies, it is then apparent whether these are track-related influences or vehicle-side effects. Changes that are detected at several sensor units with a time delay indicate track-side influences. In contrast, fluctuations that only occur at individual sensor units indicate vehicle-side influences.

LIST OF REFERENCE SIGNS 1 cybernetic observer
10 observed real reference system
11 first input for input signal u
12 second input for interference signal z
13 output for measuring signal y
20 System model
21 first input for input signal u
22 first output for reconstructed measuring signal ŷ
23 second output for observed variable(s)
24 second input
25 comparator
26 unit for weighting the comparative result
27 third output for reconstructed disturbance(s) ẑ
u input signal
y measuring signal
x state variable
reconstructed measuring signal
reconstructed state variable
z disturbance
reconstructed disturbance

The invention claimed is:

1. A method for determining changes in longitudinal-dynamic behavior, in particular of an undercarriage, of a railway vehicle for identifying a current driving condition of the railway vehicle, comprising:
   wherein variables, which cannot be measured and which characterize the longitudinal-dynamic behavior, are reconstructed and evaluated via a system model of the railway vehicle by means of a cybernetic observer from a known or metrologically determined input signal and at least one measuring signal of the observed railway vehicle as an observed real reference system,
   wherein the at least one measuring signal of the observed railway vehicle and a corresponding reconstructed measuring signal of the system model are compared and a deviation determined by comparison is recursively tracked with a regulator so that the determined deviation is minimized.

2. The method according to claim 1, wherein the input signal is additionally supplied to the system model.

3. The method according to claim 1, wherein the input signal and/or the at least one measuring signal are detected at one or more of the following components:
   a railcar body;
   an undercarriage of the railway vehicle;
   at least one bogie of the railway vehicle;
   at least one wheelset of the railway vehicle.

4. The method according to claim 3, wherein the at least one measuring signal is detected simultaneously on opposite sides of the undercarriage or the bogie or the wheelset.

5. The method according to claim 1, wherein a brake pressure of a brake actuator or a brake current for generating a braking force decelerating the railway vehicle is processed as the input signal.

6. The method according to claim 1, wherein a driving force or a motor current for generating a force which accelerates the railway vehicle is processed as the input signal.

7. The method according to claim 1, wherein a rotational speed or a change in rotational speed of at least one wheelset is processed as the at least one measuring signal.

8. The method according to claim 1, wherein a strain of a component which transmits a longitudinal force, in particular a pull/push-rod or a pivot pin or a lemniscate lever or a wheelset guide, is processed as the at least one measuring signal.

9. The method according to claim 1, wherein a spring deflection in one or more spring stages is processed as the at least one measuring signal.

10. The method according to claim 1, wherein the evaluation of the variables characterizing the longitudinal-dynamic behavior comprises a comparison of the variables of successive undercarriages or railcar bodies or wheelsets.

11. A computer program product which can be loaded directly into the internal memory of a digital control unit and comprises software code segments which, when the product runs on the control unit, carry out the method according to claim 1.

12. An apparatus for determining changes in the longitudinal-dynamic behavior, in particular of an undercarriage, of a railway vehicle for identifying a current driving condition of the railway vehicle, comprising:

a control unit and at least one sensor unit for providing a respective measuring signal, wherein the control unit is configured to reconstruct and evaluate variables, which cannot be measured and which characterize the longitudinal-dynamic behavior, via a system model of the railway vehicle by means of a cybernetic observer from a known or metrologically determined input signal and the at least one measuring signal of the observed railway vehicle as an observed real reference system, wherein the control unit is further configured to compare the at least one measuring signal of the observed railway vehicle and a corresponding reconstructed measuring signal of the system model and to recursively track, with a regulator, the deviation determined by comparison so that the determined deviation is minimized.

* * * * *